E. C. F. STREICHERT.

RADIATOR SECTION.

APPLICATION FILED JAN. 6, 1915.

Reissued Nov. 23, 1915.

14,021

Witnesses.
Byron B. Collings.
M. C. Hanrahan.

Inventor
E. C. F. Streichert
by T. Wickersham
Attorney

UNITED STATES PATENT OFFICE.

EMIL C. F. STREICHERT, OF DETROIT, MICHIGAN, ASSIGNOR, BY MESNE ASSIGNMENTS, TO HARRISON MFG. CO. INC., OF LOCKPORT, NEW YORK.

RADIATOR-SECTION.

14,021. Specification of Reissued Letters Patent. Reissued Nov. 23, 1915.

Original No. 1,076,527, dated October 21, 1913, Serial No. 726,511. Application for reissue filed January 6, 1915. Serial No. 873.

*To all whom it may concern:*

Be it known that I, EMIL CARL FREDERICK STREICHERT, a citizen of the United States, residing at Detroit, in the county of Wayne and State of Michigan, have invented certain new and useful Improvements in Radiator-Sections; and I do hereby declare the following to be a full, clear, and exact description of the invention, such as will enable others skilled in the art to which it appertains to make and use the same.

This invention relates to radiators especially adapted for automobiles, and particularly to the construction of the cells or units of which the radiator is composed, and has for its object to provide a less expensive and more efficient construction of radiator cell, than has been heretofore proposed.

With this object in view, the invention consists in the novel details of construction, and combinations of parts more fully hereinafter disclosed, and particularly pointed out in the claims.

Figure 1:
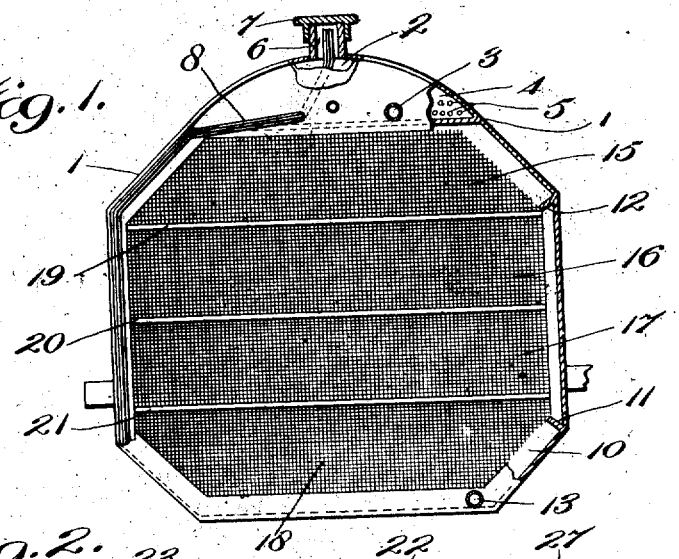
Figure 2:
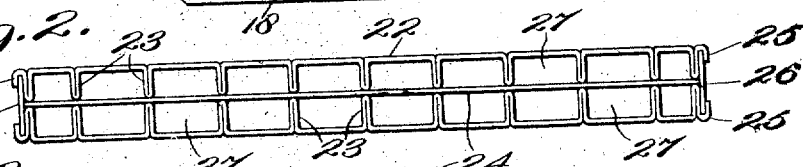
Figure 3:
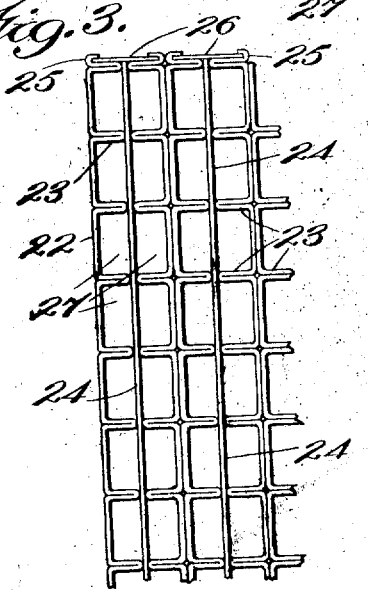
Figure 4:
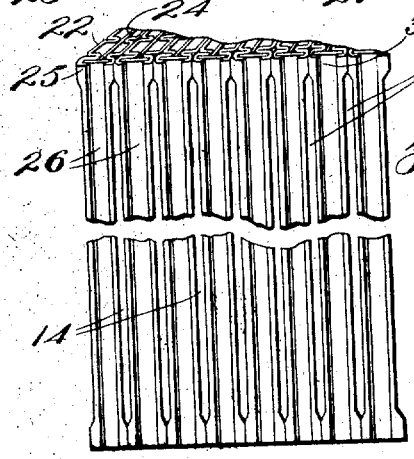
Figure 5:
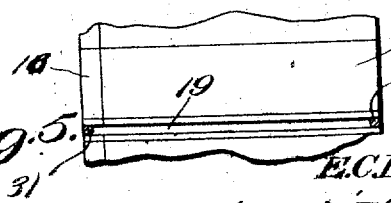

Referring to the accompanying drawing forming a part of this specification, in which like numerals designate like parts in the views: Figure 1, is a diagrammatic elevational view, partly in section, of a complete radiator having its cells constructed in accordance with my invention; Fig. 2, is an end elevational view of a unit or cell of which the radiator is composed; Fig. 3, is an end elevational view of a plurality of units placed side by side to form a radiator section; Fig. 4. is a top plan view in perspective of a radiator section formed of my individual units, and showing the vertical water courses 14 between the said units; Fig. 5. is a diagrammatic view of a plurality of radiator sections provided with a modified form of separator to form horizontal water courses 19.

1. indicates the casing of my radiator; 2. the feed chamber thereof; 3. a water supply pipe for the cooling apparatus; 4. a distributer chamber located within the feed chamber and provided with a wall having perforations 5, the function of which is to distribute the water fed through the pipe 3 over the upper part of the honey comb construction; 6. is the inlet at the top, through which a supply of water may be poured to fill the apparatus; 7. is a closure for the pipe 6; and 8. is an overflow and vent pipe which may extend partially up into the pipe 6, and which also passes out through the wall of the radiator at any suitable point.

10. is a draining chamber separated from the feeding chamber 2 by suitable partitions, such as 11 and 12; 13 is an outlet pipe for the water.

All of the above parts are or may be of the usual construction, and form no part of the present invention.

The honey comb, or cellular, construction of the radiator connects chamber 2 with chamber 10 and includes a multitude of straight unobstructed upright fluid passages 14, down through which the fluid to be cooled flows. The walls of these passages are made extremely thin, and they also constitute a portion of the vertical sides of the horizontal air passages running from front to rear of the radiator, whereby the air in the said passages is effectively cooled by the water passing through the said passages 14.

In Fig. 1, there is illustrated four complete radiator sections lettered 15, 16, 17 and 18, respectively, which sections provide between them the three horizontally-arranged water pasages 19, 20 and 21 communicating with the vertical water passages 14. The features above mentioned likewise are or may be of the usual and ordinary construction, and do not form of themselves a material portion of my invention.

As above stated, the radiator sections 15, 16, 17 and 18 are made of individual units, such as illustrated in Fig. 2, and it is in the specific construction of these units that my invention resides.

One of my units 22 is formed by taking a thin metal strip of suitable length and width and providing therein a number of folds or plaits 23 made by bending the metal in machines that are now well known, and a pair of strips thus treated are placed, opposite each other with the edges of the plaits 23 of the two strips almost touching. A plate 24 is placed between the edges of the said plaits 23 of the two strips and the extreme ends of the strips are preferably oppositely bent over, as indicated at 25, whereupon a loose piece of 26 is inserted between them. The parts being assembled as just disclosed will constitute the unit shown in Fig. 2, in which is shown a unit comprising a pair of outer plates 22, of thin sheet metal, forming portions of two rows of cells 27 and a single dividing plate 24 of thin sheet metal completing and separating said two rows of cells. That is to say the unit is provided with a number of air cells 27 separated only by the single thin plate 24. This makes a highly efficient and inexpensive radiator which is light and rigid in construction.

When the units are made as just disclosed, they are assembled side by side, as indicated in Fig. 3, and preferably held in any suitable clamping frame usually employed in holding the assembled parts of a radiator together for soldering. In order to separate the said units 22, the extreme ends 25 of the strips may be offset, as indicated at 30, or they may be separated by small rods or wires 31, such as is indicated in Fig. 5, to form the horizontal water course 19. It being a common thing to thus offset or otherwise separate the individual units, the details thereof are not further disclosed. The assembled units 22, when thus clamped in a frame in the usual manner may next be dipped in a suitable solder bath, then moved back and front in order to seal up the edges of the water course, whereupon a radiator section, such as 15 is had. Two or more sections may then be brought together, as illustrated in Fig. 1, and separated by any suitable means, such as the wires 31 shown in Fig. 5, or other separators not illustrated may be employed.

It is obvious that those skilled in the art may vary the details of construction without departing from the spirit of my invention, and therefore, I do not wish to be limited to the above disclosure, except as may be required by the claims.

What I claim is:—

1. A radiator unit comprising a pair of spaced strips having inwardly-open opposed hook portions along their transverse edges and registering series of transverse plaits, spacing closures secured between said opposed hook portions and longitudinal flat plates held between said series of transverse plaits and confined against longitudinal displacement by said end closures.

2. A radiator unit comprising a pair of spaced strips having a registering series of opposed transverse plaits, longitudinal flat plates held between said series of opposed plaits, closures seated on the opposed end plaits of said registering series for spacing said plaited strips and confining said flat plates against longitudinal displacement, and hook portions formed by bending the transverse edges of said spaced strips inwardly over said closures for securing the latter in position.

3. In a radiator section, a plurality of radiator units each comprising a pair of spaced strips having a registering series of opposed transverse plaits, longitudinal flat plates held between said series of opposed plaits, closures seated on the opposed end plaits of said registering series for spacing said plaited strips and confining said flat plates against longitudinal displacement, hook portions formed by bending the transverse edges of said spaced strips inwardly over said closures for securing the latter in position, and spacing means extending longitudinally between said several units to provide water passages therebetween.

4. An automobile radiator unit comprising a pair of outer plates of thin sheet metal forming portions of two rows of cells and a single dividing plate of thin sheet metal completing and separating said rows of cells, substantially as described.

5. An automobile radiator unit consisting of a pair of outer plates of thin sheet metal provided with integral partitions forming a portion of the walls of two rows of cells, and a dividing plate of a single thickness of thin sheet metal completing and separating said rows of cells, substantially as described.

6. A radiator section composed of a plurality of radiator units separated by water passages each unit composed of a pair of thin sheet metal plates forming portions of two rows of cells, and a dividing plate of a single thickness of thin sheet metal, completing, and separating said rows of cells, substantially as described.

In testimony whereof I affix my signature in the presence of two witnesses.

EMIL C. F. STREICHERT.

Witnesses:

SIDNEY L. ALEXANDER,

D. SULLIVAN.